United States Patent [19]

Campbell et al.

[11] 4,042,941
[45] Aug. 16, 1977

[54] VEHICLE FOR TRANSPORTING AND ELEVATING ARTICLES IN RESTRICTED AREAS

[76] Inventors: Ernest E. Campbell, 1282 Mulvane, Topeka, Kans. 66604; William H. Wells, 1317 Kallam, Topeka, Kans. 66616

[21] Appl. No.: 644,735

[22] Filed: Dec. 29, 1975

[51] Int. Cl.² ............................................. B66C 23/40
[52] U.S. Cl. ................................. 254/139.1; 212/141; 212/142
[58] Field of Search .................. 214/75 R, 95 R, 85.1, 214/3, 620; 182/63; 212/140–142, 125, 7; 254/166, 139.1

[56] References Cited
U.S. PATENT DOCUMENTS

| 631,302 | 8/1899 | Harper | 182/63 X |
| 2,249,907 | 7/1941 | Perkowski | 254/139.1 |
| 2,362,220 | 11/1944 | Shoemaker | 254/139.1 |
| 2,611,580 | 9/1952 | Troche et al. | 254/139.1 |
| 2,907,473 | 10/1959 | Garnett | 254/139.1 |
| 3,731,635 | 5/1973 | Hambrick | 254/166 X |

Primary Examiner—Robert J. Spar
Assistant Examiner—Carl Rowold
Attorney, Agent, or Firm—Schmidt, Johnson, Hovey & Williams

[57] ABSTRACT

A highly maneuverable utility vehicle has a relatively narrow chassis that includes a frame overlying a ground-engaging, direction controllable running gear which permits the vehicle to be driven through narrow passages such as through the gates of residential fences for the purpose of transporting transformers or the like to areas otherwise inaccessible to powered, load-bearing vehicles. An engine mounted at one end of the frame is operably connected with the track-type running gear and to a hoist mechanism for raising transformers for installation on power poles. Control means interconnecting the engine with the running gear and the hoist are adapted to selectively permit operation of either the running gear or the hoist mechanism.

4 Claims, 5 Drawing Figures

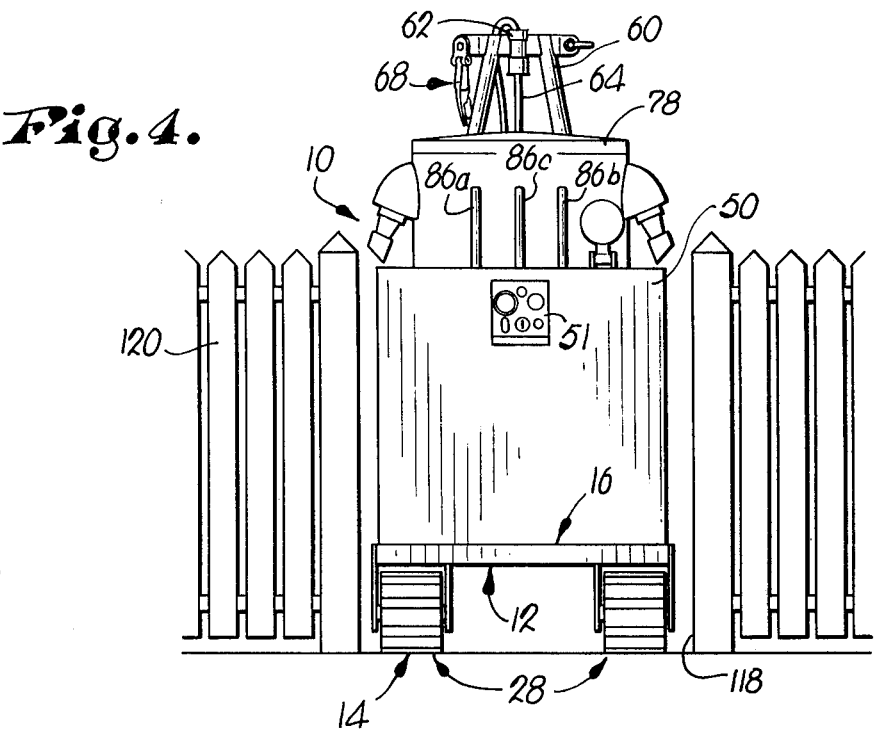
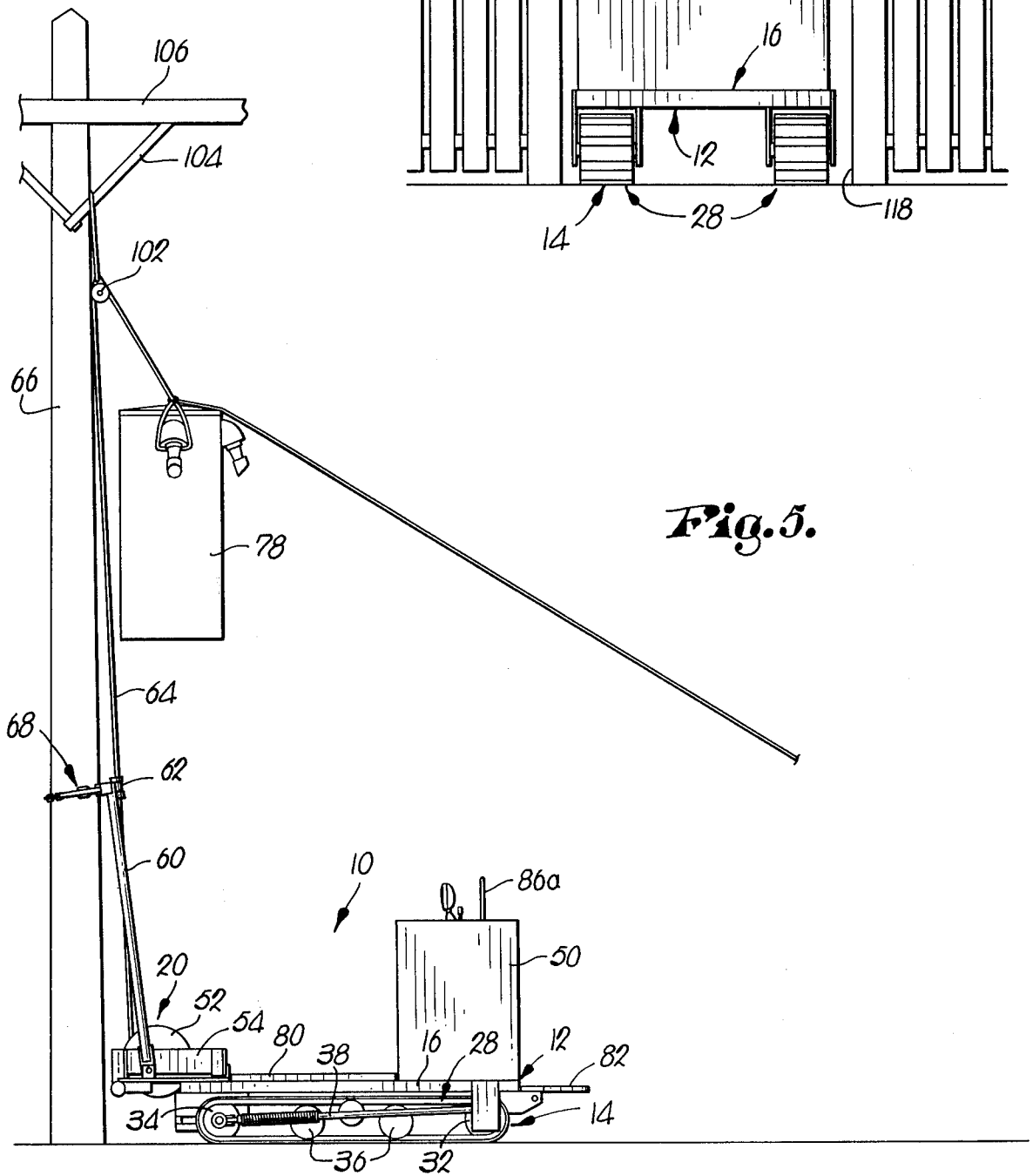

VEHICLE FOR TRANSPORTING AND ELEVATING ARTICLES IN RESTRICTED AREAS

This invention relates to a vehicle for use by utility companies or the like in transporting transformers or other heavy and hard to handle equipment items to installation sites that are normally not accessible by way of conventional, powered vehicles.

A very frequent and common occurrence is the need to replace transformers on electric utility poles that are located in out-of-the-way and hard to reach locations such as in residential areas where sufficient right-of-way has not been provided to enable a truck or similar vehicle to gain access thereto or in situations where fences, hedges or buildings restrict the accessibility of equipment. In such instances it is necessary for the line crews to laboriously drag the transformer manually to its installation site from the nearest point to which the transporting vehicle may be driven. When faced with this task the crews usually use a two-wheeled cart to transport the transformer this distance and they frequently have to use a block and tackle arrangement attached to a nearby tree or pole to assist them in moving the cart toward the ultimate location of the transformer. In this connection, it is to be noted that transformers are extremely heavy with transformers which are elevated to the top of poles usually weighing up to about 1,300 pounds, while pad-mounted transformers may weigh as much as 4,000 pounds. Thus, it can be readily recognized that these transformers are not easily moved from one point to another.

An additional difficulty frequently encountered is that these transformers need to be moved through relatively narrow gates as would be found in neighborhood yards which usually are not more than about 36 inches wide. This further restricts the maneuverability of any type of transport device that might be utilized in moving the transformers. In this connection it is highly desirable to be able to transport the transformer without resorting to dismantling or removal of any stretches of fence, shrubbery, hedges or the like inasmuch as such action is very costly, both in time and labor as well as replacement cost. Another problem that occurs in moving transformers to utility poles or the like is that of damaging the lawn surfaces over which the transformer must be transported. Wheeled vehicles, whether they be self-propelled or of the cart type as previously mentioned, have a tendency to not only leave tracks, particularly in soft ground, but also have a tendency to loosen the crown of the grass, causing damage, and in some instances, even killing the grass at these places.

It is, therefore, a very important object of our invention to provide a vehicle for transporting articles in restricted areas that overcomes the hereinabove outlined problems occurring in connection with transporting transformers or the like to their installation sites.

It is yet another important object of the invention to provide a utility type vehicle that not only enables heavy and cumbersome objects to be transported to their point of usage, but also is capable of assisting in positioning the article in its desired location.

A still further object of our invention is to provide a utility vehicle that is capable of raising transformers or the like to an elevated position.

Yet another object of the invention is to provide a utility vehicle which includes automatic safety cutout means to prevent actuation of the full running gear during those times that other work-performing apparatuses are in operation.

Yet another object of our invention is to provide a utility vehicle that is capable of maneuvering in relatively close spaces for the purpose of transporting a transformer or the like to a utility pole and is capable of hoisting the transformer or similar object to an elevated position for installation.

Figure 1:
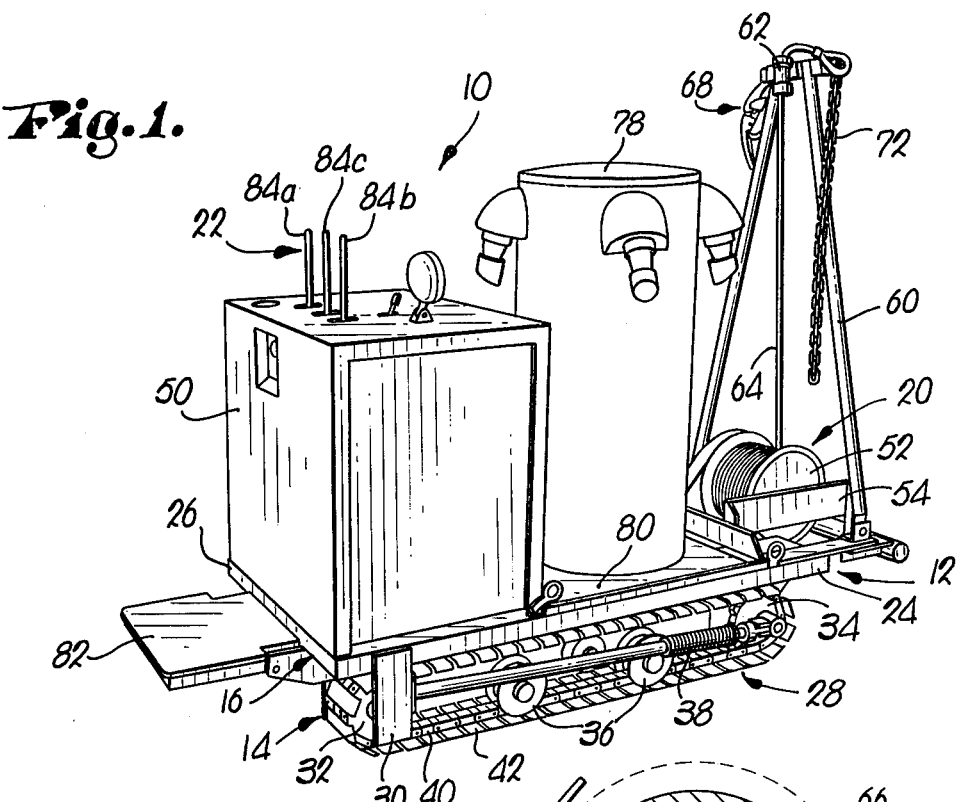
FIG. 1 is a perspective view of a utility vehicle made pursuant to the present invention and illustrating an electrical power transformer loaded thereon.

FIG. 4 is an end view of the utility vehicle, taken from the end at which the engine and operator controls are located, illustrating the relative width of the vehicle as compared to a normal opening in a residential yard fence; and FIG. 5 is a side elevational view of the vehicle along with a utility pole to which it is operably attached for hoisting a transformer from its load platform to an installation point on the utility pole.

A utility vehicle broadly designated by the numeral 10 has a chassis 12 that includes a ground-engaging, direction controllable running gear 14 and an elongate frame 16 that overlies the running gear 14. Additionally, the vehicle 10 is provided with a power means which includes an air-cooled engine, generally denoted by the numeral 18, carried by the frame 16 and operably coupled with the running gear 14 for rendering the vehicle 10 self-propelled, and a hoist mechanism 20 mounted on the frame 16 and operably coupled with the engine 18. Selective operation of the running gear 14 and the hoist mechanism 20 is accomplished through the use of control means 22 which interconnect the power means 18 with the running gear 14 and hoist mechanism 20.

The frame 16 is essentially rectangular in shape and presents an overall width substantially the same as that presented by the running gear 14 as best illustrated when viewing FIG. 4. Construction of the frame 16, which is supported by the running gear 14, is basically that of providing a pair of longitudinal side rails 24 interconnected by transverse endpieces 26 (only one of which is shown) along with other suitable cross-bracing as may be required. Securement of the frame 16 to the running gear 14, which is in the form of a pair of track assemblies 28 laterally spaced from and in parallelism with each other proximal to and generally beneath the opposed side rails 24, is accomplished by way of suitable brackets 30 depending from the frame 16.

The track assemblies 28 extend generally the entire length of the frame 16 and are carried by the usual respective drive rollers 32 at one end thereof and respective idler rollers 34 at their opposite ends with intermediate idler rollers 36 which carry both the top and bottom stretches of their corresponding assemblies 28. Suitable spring-loaded track-tensioning mechanisms, such as that illustrated and identified by the numeral 38, are operably coupled with their corresponding idler roller 34 for maintaining the assembly 28 under proper tension. Each assembly 28 is comprised of a roller chain to which a multiplicity of track-like straps 42 are transversely attached with the chain 40 being received around the rollers 32–36.

The air-cooled gasoline engine 18 is situated at one end of the frame 16. Additionally to the engine 18, the power means includes a hydraulic drive arrangement in the form of a hydraulic pump 44 operably coupled with the engine 18 and a hydraulic motor 46 for each track assembly 28. These motors 46 are suitably mounted on the frame 16 and each include a sprocket and chain drive assembly 48 coupling each motor 46 with its corresponding drive roller 32. A suitable housing 50, having a control panel 51, enshrouds the engine 18 and the pump 44 for the purpose of shielding the engine as well as protecting the vehicle operator.

Disposed at the opposite end of the frame 16 is the hoist mechanism 20 which includes a winch 52 carried by suitable brackets 54 and powered by a hydraulic motor 56 operably coupled with the pump 44. A chain and sprocket drive assembly 58 interconnects the motor 56 with the winch 52. Also forming a part of the hoist mechanism 20 is an inverted V-shaped member or brace 60 which presents a generally upstanding A-frame arrangement and is pivotally secured at its lower, divergent ends to the frame 16. The upper or apex end of the brace 60 is provided with a tubular guide 62 through which a hoist rope 64 is guided.

Structure for securing the vehicle 10 to a utility pole 66 or the like is located at the apex end of the member 60 and defines a snubber assembly 68 comprised of a pair of oppositely extending, laterally disposed brackets 70, one of which receives and carries a length of chain 72 having a suitable fitting 74 at its distal end for cooperation with an over-center latch 76 carried by the other bracket 70. Thus, when the fitting 74 is in engagement with the latch 76 such that the chain 72 encompasses the pole 66, the brace 60 is lashed to the pole 66.

In use, the vehicle 10, which for illustrative purposes has been presented as having particular utility in connection with transporting a transformer 78 to a point of installation, has a load platform 80 located on the elongate frame 16 between the housing 50 located at one end and the hoist mechanism 20 located at the other end. Further, let it be assumed that the transformer 78 has been previously placed on the platform 80, and the vehicle 10 driven to the pole 66. In so doing, an operator may either have walked beside the vehicle 10 as it was moving, or if the speed was such that it would be easier to ride, a fold-down platform 82 is provided at the housing end of the frame 16 upon which the operator may stand. In this connection, the engine 18, along with the pump 44 and motors 46, are geared to provide approximately 3-mile per hour maximum speed which has been found to be most desirable.

Control of the vehicle 10 is accomplished through manipulation of levers 84a and 84b which form part of hydraulic control valves 86a and 86b which, in turn, are a part of the control means 22. A third valve 86c, controlled by a lever 84c, is provided for actuation of the hoist motor 56.

Arrangement of the hydraulic circuitry prevents inadvertent actuation of both of the hoist mechanism 20 during such time as the vehicle is underway. This is accomplished through a suitable plumbing arrangement in which the fluid flow from the pump 44 is directed first of all, through a flow divider 87 prior to the valves 86a and 86c. Thus, the hydraulic fluid is carried from the pump 44 to the flow divider 87 via a line 88 and to the valves 86a and 86c via lines 90a and 90b. Presuming that the lever 84c is in its self-centering, neutral position, the fluid flowing to valve 86c is directed therethrough and on to the valve 86b via line 90c. Therefore, when the levers 84a and 84b are actuated, their corresponding motors 46 are likewise powered.

Inasmuch as the levers 84a and 84b are also self-centering to a neutral position, forward pressure on the levers would result in the fluid being directed to their respective motors 46 via lines 94a and 94b after which the fluid returns to the corresponding valves via return lines 96a and 96b. The circuit is then completed by the fluid being directed to a reservoir 98 through a system of return lines generally identified by the numeral 100.

It is, of course, to be understood that a reverse direction can be accomplished by further manipulation of the levers 84a and 84b in a rearward direction which reverses the flow of fluid in lines 94a, 94b and lines 96a and 96b. Forward and rearward manipulation of the levers 84a and 84b is understood to be with respect to an operator standing on or near the platform 82 such that any motion of the levers away from him would be in a forward direction and conversely, movement toward him would be in a rearward direction.

Figure 2:
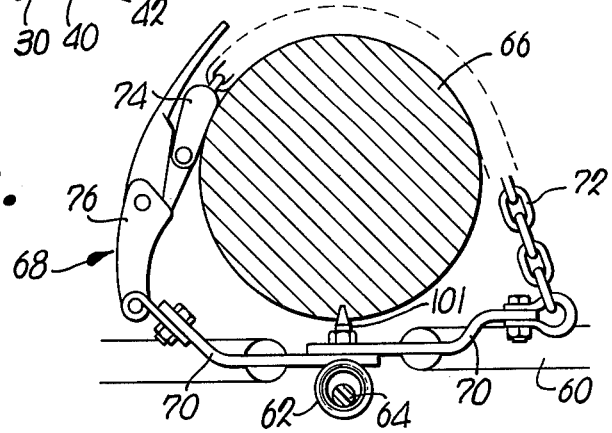
FIG. 2 is an enlarged, horizontal view illustrating the snubbing structure for securing the vehicle to a utility pole or the like, the pole and a hoist rope being shown in section.
Figure 3:
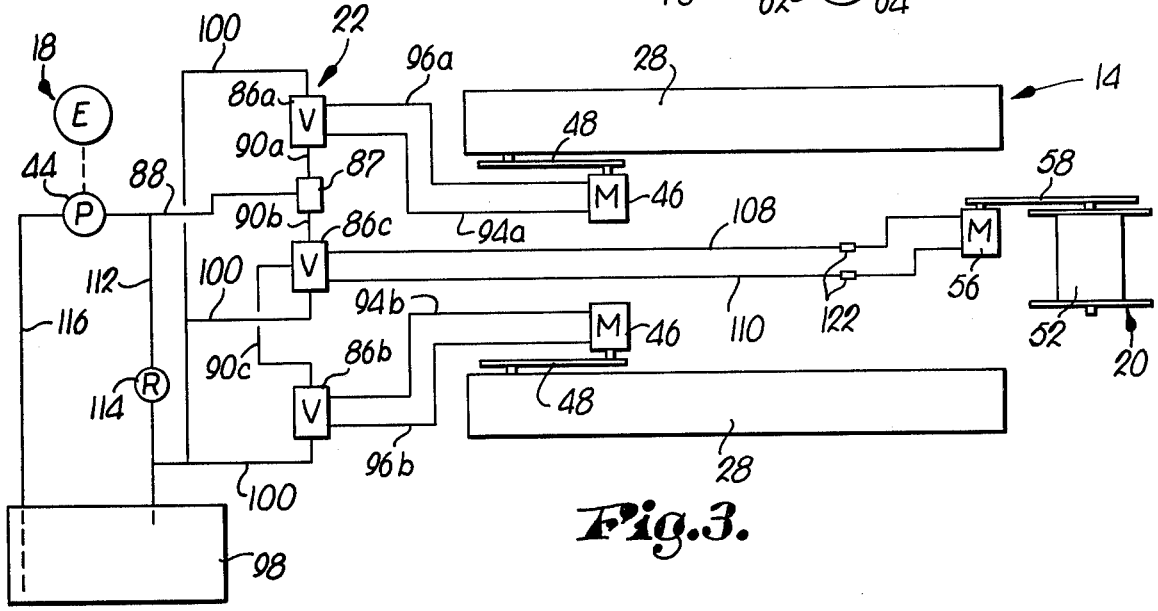
FIG. 3 is a diagram schematically illustrating the hydraulic power circuit for the vehicle and a hoist mechanism associated therewith.

Now, presuming that the vehicle 10 has been driven to the location at which the transformer 78 is to be hoisted onto a pole 66, the vehicle is maneuvered to the base of the pole 66 such that the snubber assembly 68 may be used to lash the member 60 to the pole as is clearly shown in FIG. 2. Snubbing of the brace 60 to the pole 66 results in a prong 101 located on the brace 60 near the apex thereof to extend inwardly therefrom, to be at least partially embedded in the pole 66. The purpose of this prong 101 is to provide an anchor point to assist in holding the vehicle 10 in position during raising of the transformer 78 to its elevated position, it being remembered that the relative weights of the transformer and the vehicle 10 may be such that the transformer is very nearly the same or even possibly more than the vehicle itself.

The rope 64, which preferably is in the form of a high tensile nylon rope readily available for such uses is threaded through the guide 60 such that it forms a part of a block and tackle assembly 102 which has been secured to a brace 104 of a crosspiece 106 near the top of the pole 66; this arrangement is clearly shown in FIG. 5. The rope 64 is then suitably attached to the transformer 78 after which time the same is in a condition to be lifted from the platform 80 for installation.

The hydraulic circuitry for actuating the hoist mechanism 20 is as follows: forward movement of the lever 84c restricts any further flow of hydraulic fluid into the line 90c and, alternatively, directs the flow of fluid into line 108 interconnecting the valve 86c with the hydraulic motor 56. The return flow of fluid is directed through return line 110 back to the valve 86c. Rearward movement of the lever 84c reverses the direction of flow of fluid through the lines 108 and 110 for rotating the winch 52 in an opposite direction. At any time that the lever 84c is returned to its self-centered, neutral position, fluid flow communication is reestablished with the line 90c to permit the selective actuation of the valves 86a and 86b in lieu of the valve 86c.

During those times that the engine 18 is operating but the valves 86a, 86b and 86c are in their neutral positions, the hydraulic fluid is permitted to circulate directly back to the reservoir 98 via a bypass line 112 in which a relief valve 114 is interposed. The suction side of the pump 44 is in communication with the reservoir 98 by way of a line 116 while a third return line 100 directs the flow from the valve 86a to reservoir 98 during manipulation of the hoist mechanism 20.

Based on the foregoing description it will be readily seen that a versatile utility vehicle has been provided which eliminates the need for manually transporting heavy and bulky objects such as transformers through generally inaccessible areas such as narrow gates 118, for installation. The relatively narrow width which, in this case, is approximately 32 inches wide, enables the vehicle to be driven through the normal 36 inch gates 118 usually found in residential yard fences 120 as shown in FIG. 4. Because of the bulkiness and relatively heavy weights involved, the vehicle 10 must be stable and present a low center of gravity while still providing sufficient space for the object to be hauled. By having the frame 16 overlie the running gear 14, adequate space is provided for the engine 18 as well as a load platform 80 along with the hoist mechanism 20.

The flat track assemblies 28 provide adequate weight distribution of the vehicle as it passes over lawns and minimizes any trampling that might otherwise occur to the grass as would normally be expected when such weights are hauled thereacross. Not only is the vehicle 10 well adapted for use in confined areas, but it is also equally well-suited for providing the lifting means for ultimately placing the transformer in its elevated position and therefore serves the dual purpose of not only transporting the transformer to the site but also elevates the same to its final location.

The vehicle 10 is equally useful in transporting pad-mounted transformers to an installation site. When so used, the vehicle is provided with an overhead frame and boom structure operably coupled with the hoist mechanism 20 in order that the transformer can be lifted vertically. In this instance, an auxiliary load platform would be located over the regular platform 80 and the winch 52 while the A-frame member 60 would be removed. Outriggers should also be operably installed to provide additional stability for safety reasons during transfer of the transformer. By providing the overhead frame and outreaching boom structure the transformer can be raised vertically, shifted horizontally to a position over the pad-mount and then lowered straight down for installation as is required because of the upwardly projecting conduit normally extending from the top of the pad mount.

It is to be understood that while the vehicle has been shown to have particular utility for the installation of transformers, it may also be readily adapted for purposes other than that illustrated. Examples of such other uses would be for attachments such as post-hole diggers, augers, well casing pullers, wire stringers, concrete busters, etc. The lines 108 and 110 preferably are provided with quick disconnect fittings 122 in order that the work performing devices might be operably coupled with the hydraulic valve 86c. Furthermore, a gin pole arrangement with outriggers could be adapted to the vehicle and, because of its relatively narrow width, such a unit could be driven up into the bed of a pickup and secured thereto to serve as a portable lift. Additionally, the platform 80 may be provided with horizontally disposed rollers to enable loads to be moved laterally during loading and unloading.

Having thus described the invention, what is claimed as new and desired to be secured by Letters Patent is:

1. A vehicle for transporting electrical pole mounted equipment such as a transformer to a supporting upright utility pole and hoisting said equipment to an emplacement at the top of said pole, said vehicle including:
    a chassis that has a narrower overall width and a shorter overall length than a standard road vehicle for rendering the vehicle maneuverable in restricted areas,
    said chassis including a ground-engaging, direction controllable running gear and an elongate frame supported by said running gear;
    power means carried by said frame, and operably coupled with said running gear to render said vehicle self-propelled;
    hoisting mechanism mounted on said frame and operably coupled with said power means;
    said mechanism including a block and tackle assembly that is releasably supportable on said pole near the top of the latter when the vehicle is hoisting said equipment;
    said mechanism further including a snubber assembly for releasably securing said frame to said pole during said hoisting, so that the frame is positively restrained against vertical movement relative to the pole; and
    control means interconnecting said power means with said running gear and said hoisting mechanism for selectively operating the same.

2. A vehicle as claimed in claim 1, said snubber assembly including a pole-penetrating prong adapted to be embedded in said pole when the frame is secured to the latter whereby the frame is positively restrained against vertical movement relative to the pole.

3. A vehicle as claimed in claim 2, wherein said snubber assembly is supported by an inverted V-shaped member pivotally secured to said frame at one end thereof.

4. A vehicle as claimed in claim 3, wherein said mechanism includes a winch on said frame, said member supporting said snubber assembly is positioned substantially over said winch.

* * * * *